United States Patent [19]

Ohki

[11] Patent Number: 4,598,451
[45] Date of Patent: Jul. 8, 1986

[54] METHOD OF PRODUCING A RACK FROM PIPE MATERIAL AND A RACK THUS PRODUCED

[75] Inventor: Takanosuke Ohki, Yokohama, Japan

[73] Assignee: Kokan Kako Co., Ltd., Yokohama, Japan

[21] Appl. No.: 603,557

[22] Filed: Apr. 25, 1984

[30] Foreign Application Priority Data

May 2, 1983 [JP] Japan .................................. 58-76278

[51] Int. Cl.⁴ ............................................. B29D 15/00
[52] U.S. Cl. ...................................... 29/159.2; 74/422
[58] Field of Search ..................... 29/159.2; 72/370; 74/422

[56] References Cited

U.S. PATENT DOCUMENTS 1,879,663  9/1932  Dreyer ................................ 72/370
4,133,221  1/1979  Clary ................................. 29/159.2

FOREIGN PATENT DOCUMENTS 2061138  5/1981  United Kingdom ............... 29/159.2

Primary Examiner—Howard N. Goldberg
Assistant Examiner—P. W. Echols
Attorney, Agent, or Firm—Poms, Smith, Lande & Rose

[57] ABSTRACT

A pipe material is tightly clamped into a first pair of split forming dies to form a first formed tubular body which comprises a cylindrical wall part and a flat wall part, and then the first formed body is clamped tightly into a second pair of split forming dies, the interior of which is formed to be complementary to a toothed rack to be produced on the flat wall part. A mandrel is then forcefully inserted, either with or without vibration, into the bore of the first formed part while contained within the second forming dies, so that the teeth of a rack are formed on the flat wall of the first formed part by plastic deformation. A rack thus produced from a pipe material is light in weight and inexpensive, while functionally equivalent to a rack conventionally produced by machining from a round bar.

4 Claims, 8 Drawing Figures

METHOD OF PRODUCING A RACK FROM PIPE MATERIAL AND A RACK THUS PRODUCED

BACKGROUND OF THE INVENTION

1. Field of the Invention

The present invention relates to a method of producing a rack, and in particular, to a method of producing a rack by plastic deformation from pipe material, and also to a rack thus produced which is tubular and light in weight.

2. Prior Art

A rack generally comprising, as shown in FIG. 1 by numerical reference 1, a row of teeth 1a formed on its outer surface to be engaged with a pinion has been widely utilized for example as a steering gear mechanism of an automobile through which movement of the steering wheel is transmitted to the front wheels, and for many other applications.

In the prior art, a rack has usually been manufactured by machining a round, metal bar, such as steel, which has resulted in racks that are heavy and expensive to make.

Accordingly, it is the primary object of the present invention to provide a method of manufacturing a rack which is remarkably light in weight compared to the rack 1 manufactured by a conventional method, and which also achieves the same functions as the conventional rack.

It is another object of the invention to provide a method of manufacturing which is suitable for mass production of racks more simply and less costly than the prior art.

Also, it is an object of the invention to provide a light weight and inexpensive track which is functionally equivalent to the prior art rack.

SUMMARY OF THE INVENTION

In order to achieve the above said objects, according to the present invention, there is provided a novel method of manufacturing a rack from pipe material comprising the steps of: forming a flat side wall by plastic deformation of a part of the outer cylindrical wall of a pipe material which has substantially the same diameter of a rack to be produced therewith, clamping the said deformed pipe material into forming dies, the inside of which contains a surface adjacent to the flat wall, having the teeth and the flutes of a female gear pattern mold which is complementary to the rack to be produced, forcefully inserting a mandrel into the bore of said deformed pipe material from one end, so that the said flat side wall of the said deformed pipe material is forced into the teeth and flutes of the complementary gear pattern mold of the dies to form teeth of a rack on the outer surface of the flat side wall.

There is also provided, in two embodiments, a rack which is produced from a tubular pipe material by the above method, comprising a cylindrical wall, a flat wall and a gear pattern provided on said flat wall, in which, in the first embodiment, the flat wall preferably has longitudinally at least the same length and transversely the same width as the teeth of the rack, and in the second embodiment, the flat wall is formed along the whole length of the rack.

DESCRIPTION OF THE DRAWINGS

The present invention will now be described in detail, by way of example, with reference to the accompanying drawings in which.

DESCRIPTION OF THE PREFERRED EMBODIMENT

Figure 1:
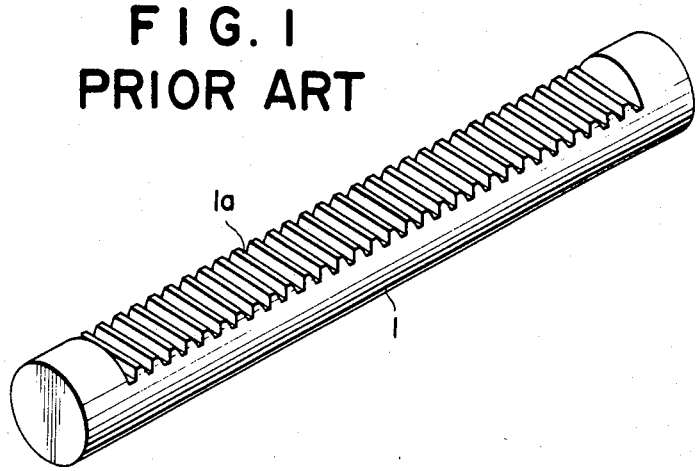
FIG. 1 is a schematic perspective view of a rack manufactured by a conventional method.
Figure 2:
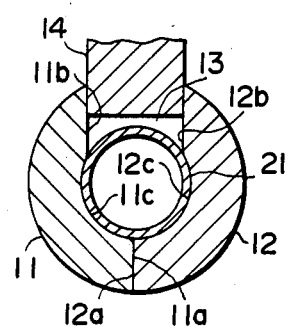
FIG. 2 is a cross-sectional view of the first split forming dies with a pipe material being clamped therein before an operation of forming a flat surface on the pipe material is started.

Referring to FIG. 2, there is shown a pair of first split forming dies 11 and 12, both of which are symmetrical and diametrically opposed in the shape of generally half divided cylinders.

Both split forming dies 11, 12 comprise lower opposed surfaces 11a, 12a and upper opposed surfaces 11b, 12b for each, the said lower opposed surfaces 11a and 12a, being parallel are designed to come into contact with each other to fit together over their whole surface when both split dies are joined together, while the said upper opposed surfaces 11b and 12b are designed to be spaced apart in parallel with each other, so as to form a longitudinal parallel groove 13 therebetween, which has substantially the same width as a desired face width of the teeth of a rack to be obtained. Each split forming die also comprises arcuate inner walls 11c, 12c formed between the upper surfaces 11a, 12a and the lower surfaces 11b, 12b.

A pipe material 21 having substantially the same diameter of a rack to be obtained is tightly clamped into the split dies 11, 12 and between the opposing arcuate inner walls 11c, 12c and the split dies 11, 12 are joined together in a suitable manner which is well known to the art. The pipe material is made of a metal, such as that in steel tubular pipes, which is suitable for plastic working with a sufficient elongation characteristic.

Figure 3:
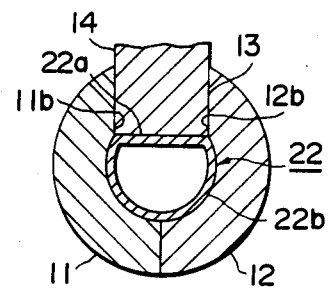
FIG. 3 is a cross-sectional view of the pipe material of FIG. 2 after the said operation is completed.
Figure 4:
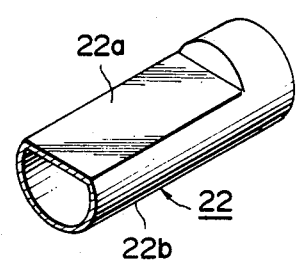
FIG. 4 is a partial perspective view of a first formed part as seen in FIG. 3.

Next, as shown in FIG. 3, a press die 14 in the shape of a square bar, with length a little longer than the teeth of the rack to be obtained and width substantially the same as the parallel groove 13, is pressed into the groove, and the pipe material 21 is formed in the manner of a conventional press into a first formed part 22, which is tubular and comprises a cylindrical wall 22b and a flat wall 22a above the cylindrical wall 22b corresponding to the teeth of a rack to be obtained as seen in FIG. 4.

Figure 5:
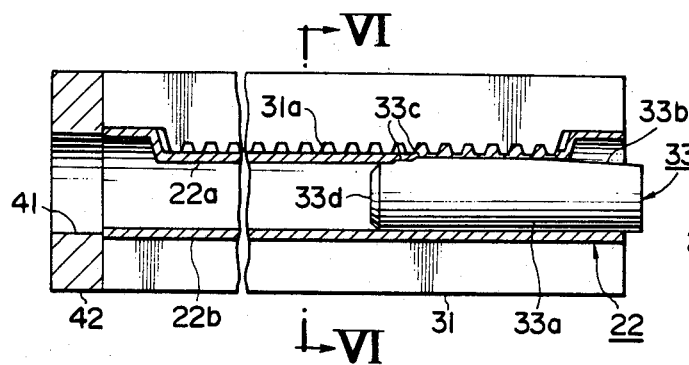
FIG. 5 is a longitudinal sectional view of the first formed part within second forming dies in the second forming operation.
Figure 6:
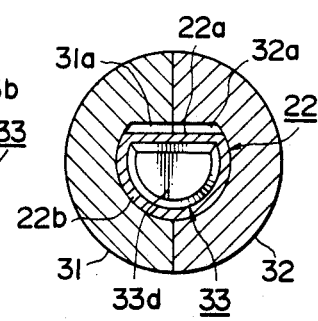
FIG. 6 shows a cross-sectional view of FIG. 5, taken at the section VI—VI.

In the next step of the invented method, referring to FIG. 5 and 6, there is provided a pair of second split forming dies 31 and 32, being symmetrical and diametrically opposed, and containing an internal surface into which is formed a female gear pattern which is complementary to that of the rack to be produced. In particular, each split die 31, 32 has half of a semicylindrical inner bore formed therein when both dies are joined together, in which alternating toothed and fluted surfaces 31a and 32a are provided in the split dies 31, 32 on the upper parts of the inner bore, the said surface being fluted and toothed across the axis of the bore to correspond to the teeth and flutes, respectively, of the rack to be produced.

In FIG. 5 and 6, there is also provided a punch 33 having cross-section of a major segment, in which cylindrical part 33a has nearly the same diameter as the inner diameter of the cylindrical part 22b of the first formed part 22, and in which the distance between the axis of the mandrel and a top flat surface 33b is a little longer than the distance between the axis of the cylindrical part 22b of the first formed part 22 and its flat wall 22a. Steps 33c are formed at the front end part of the flat surface 33b, as indicated on the left in the drawing, with the distance from the axis reducing along the axis in the direction toward the front end, and a front end surface 33d has a similar shape to, and is somewhat smaller in size than the inner cross-section of the first formed part 22.

A rack equivalent to a rack produced by a conventional method of the prior art is produced through the second forming process subsequent to the above first forming process, comprising the following steps of: Clamping the first formed part 22 to fit into the second split forming dies 31, 32, which are then firmly fastened together, forcibly inserting the mandrel 33 into the first formed tubular part 22 within the dies from the right end as shown in FIG. 5, so that only the flat surface 22a of the first formed part 22 is forcibly displaced into the fluted surfaces 31a, 32a of the split dies 31, 32 by the actuation of the steps 33c, so as to be embossed and formed into the required teeth shape by plastic deformation.

In the above second forming process, it may be suitable to provide a plug 42 which has an opening 41 of somewhat smaller diameter than the outer end configuration of the first formed part 22, which contacts with the second split forming dies 31, 32 at its left end, as shown in FIG. 5, in order to prevent the first formed part 22 being pushed out through the inner bore of the dies.

In order to obtain smooth workability and higher formability, it is also desirable to add proper vibration to the mandrel 33 as it is being inserted into the first formed part during the second forming process.

Those skilled in the art will recognize that a rack produced in accordance with the present invention has a hardness and strength which is adequate for practical use, and which compares favorably to a rack produced by a machining or cutting operation upon a raw pipe material, which hardness and strength result from the work-hardening effect obtained through the process of plastic deformation. It may be desirable to perform hardening or quenching to the second formed port subsequent to the second forming process, in order to increase hardness and strength of the rack, if required.

Figure 7:
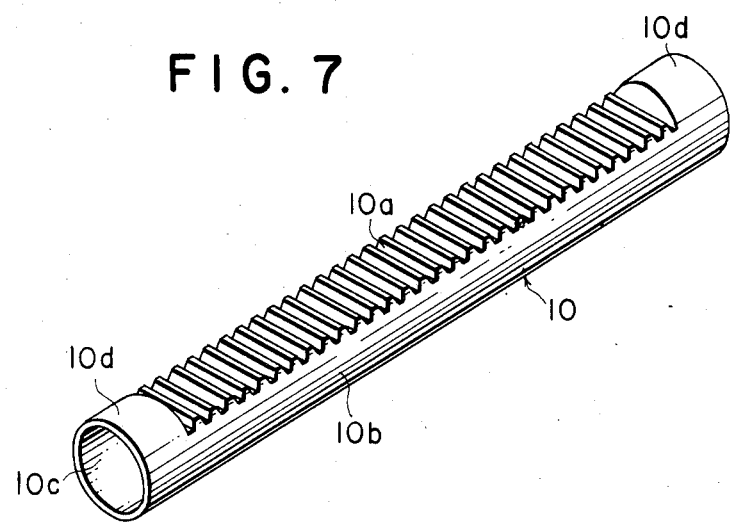
FIG. 7 is a schematic perspective view of a first embodiment of a rack produced by a method according to the present invention.

FIG. 7 shows a first embodiment of a rack 10 which is produced from a pipe material by the method as described above, comprising a flat wall part including teeth 10a formed in the required shape thereon, a cylindrical wall part 10b, an inner bore 10c and end 10d which retained the cylindrical shape of the raw pipe material before deformation. The teeth 10a may be formed along the whole length of the flat wall part, or only along a portion thereof.

Figure 8:
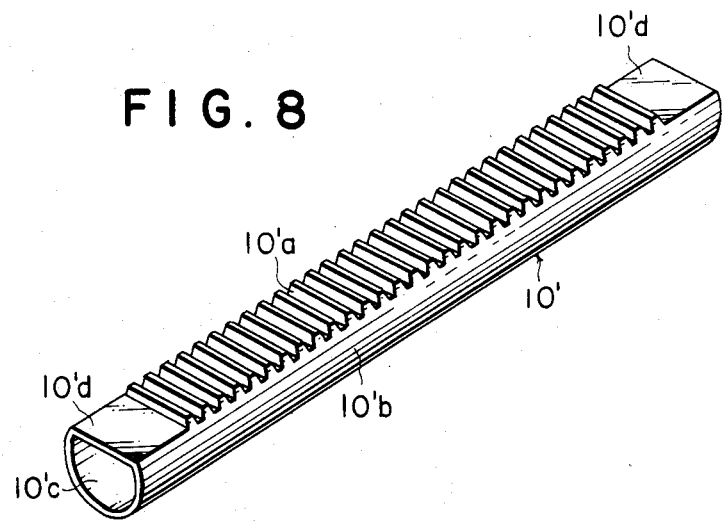
FIG. 8 shows a second embodiment of a rack according to the present invention.

FIG. 8 shows a second embodient of a rack 10' which can be produced from a pipe material by the method according to the invention, as in the first embodiment, in which, however, the flat wall part is formed along the whole length of the pipe material in the first forming process, so that both ends 10d' include cylindrical parts 10b' and flat wall parts, and the teeth 10a' may be provided only upon a part of the flat surface or upon the whole surface from one end of the deformed pipe material to the other, if required.

As is clear from the previous descriptions, the method according to the present invention in much more advantageous than the prior art in that it enables the simple and effective production of a rack which is not only equal to a rack produced by a conventional method, but also is very light in weight, because it is hollow and tubular, and which may provide excellent yield rates of raw materials so as to minimize cost of manufacturing and the end product.

What is claimed is:

1. A method of manufacturing a geared rack from a length of cylindrical pipe having substantially the same external diameter as the rack, comprising the steps of:

preforming a flat side wall into the wall of said length of cylindrical pipe for a portion of said length of said pipe;

clamping said preformed length of pipe into a forming die containing a D-shaped internal bore through a portion of its length, said bore having a semicylindrical internal wall with a diameter substantially the same as the external diameter of said length of preformed pipe, and an internal, planar surface opposing said flat side wall of said preformed length of pipe, which said planar surface contains a female mold comprising the flutes and tooth of a female gear pattern which is complementary to that to be embossed in said flat side wall of said length of preformed pipe; and inserting a mandrel into one end of said preformed length of pipe and through said length of pipe for a distance equal to said portion of said preformed length of said pipe containing said flat side wall, said mandrel having a cross-sectional area slightly greater than the internal cross-sectional area of said length of preformed pipe, such that said side wall of said length of preformed pipe is forced into contact with said female mold of said gear pattern to emboss said gear pattern into said flat side wall of said length of pipe.

2. The method of claim 1, wherein said mandrel further comprises:

a semicylindrical member having a D-shaped cross section substantially throughout its length and a first end perpendicular to the central axis of said member for insertion into said length of preformed pipe, said member having an external diameter substantially the same as the internal diameter of said length of preformed pipe, said member having an external, planar surface for opposing the internal surface of said flat side wall of said preformed pipe which is parallel to said central axis of said member and radially spaced from said axis by a distance which is slightly greater than the distance by which said internal surface of said flat side wall of said length of preformed pipe is spaced from its central axis, said member having an inclined-plane surface tapering said first end into said external planar surface for ease of insertion of said member into said length of preformed pipe, said first end being tapered for a short length of said member for further ease of insertion into said length of preformed pipe.

3. The method of claim 2, further comprising the step of:

providing a plug at the end of said internal bore of said forming die opposite to said one end through which said mandrel is inserted to retain said length of preformed pipe in said die during said embossing of said gear pattern therein, said plug having an opening therethrough which is slightly smaller in diameter than said external diameter of said pipe.

4. The method as set forth in claim 3, in which the mandrel is vibrated during insertion into the preformed length of pipe.

* * * * *